(12) United States Patent
Izumi et al.

(10) Patent No.: US 10,924,035 B2
(45) Date of Patent: Feb. 16, 2021

(54) POWER CONVERSION DEVICE

(71) Applicant: Mitsubishi Electric Corporation, Tokyo (JP)

(72) Inventors: Kikuo Izumi, Tokyo (JP); Takahiro Kato, Tokyo (JP); Yutaka Kuboyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/635,477

(22) PCT Filed: Dec. 14, 2017

(86) PCT No.: PCT/JP2017/044895
§ 371 (c)(1),
(2) Date: Jan. 30, 2020

(87) PCT Pub. No.: WO2019/077764
PCT Pub. Date: Apr. 25, 2019

(65) Prior Publication Data
US 2020/0389100 A1     Dec. 10, 2020

(30) Foreign Application Priority Data
Oct. 16, 2017 (JP) .............................. JP2017-200554

(51) Int. Cl.
*H02M 7/5387* (2007.01)
*H02S 40/32* (2014.01)
(Continued)

(52) U.S. Cl.
CPC ....... *H02M 7/53871* (2013.01); *H02J 3/1821* (2013.01); *H02S 40/32* (2014.12); *H02M 2001/0003* (2013.01)

(58) Field of Classification Search
CPC ........... H02M 7/5387; H02M 7/53871; H02M 7/53873; H02M 7/525; H02M 7/527; H02M 7/529
(Continued)

(56) References Cited

U.S. PATENT DOCUMENTS 8,982,592 B2 * 3/2015 Tan .......................... H02M 7/48
363/95
2013/0155732 A1 6/2013 Wagoner et al.
(Continued)

FOREIGN PATENT DOCUMENTS

CN      103326399 A    9/2013
JP      2006-67760 A   3/2006
(Continued)

OTHER PUBLICATIONS

Foreign Office Action of German Patent Application No. 112017007789.3 dated Aug. 20, 2020 with English translation.

*Primary Examiner* — Nguyen Tran
(74) *Attorney, Agent, or Firm* — Birch, Stewart, Kolasch & Birch, LLP.

(57) ABSTRACT

A power conversion device includes a power converter connected to an electrical storage device that stores DC power, and having a function to convert the DC power stored in the electrical storage device into AC power, and also having a function to output the AC power to one or both of a customer load and a power system; a detection unit that detects voltage and current at a first point on a power line that connects the power converter with the power system; and a control unit that generates a drive command for controlling the power converter based on the voltage and the current detected by the detection unit. The customer load is connected to a second point, on the power line, between the power converter and the first point. The power converter (Continued)

operates on the basis of the drive command generated by the control unit.

7 Claims, 12 Drawing Sheets

(51) Int. Cl.
*H02J 3/18* (2006.01)
*H02M 1/00* (2006.01)

(58) Field of Classification Search
USPC .................................. 363/40, 41, 131, 132
See application file for complete search history.

(56) References Cited

U.S. PATENT DOCUMENTS

2016/0006338 A1* 1/2016 Sakimoto ................ H02P 9/105
363/131
2016/0079752 A1 3/2016 Matan et al.

FOREIGN PATENT DOCUMENTS

| | | |
|---|---|---|
| JP | 2006-94684 A | 4/2006 |
| JP | 2010-019638 A | 1/2010 |
| JP | 2013-165593 A | 8/2013 |
| JP | 2015-223041 A | 12/2015 |

\* cited by examiner

POWER CONVERSION DEVICE

FIELD

The present invention relates to a power conversion device having a function to convert direct current (DC) power stored in an electrical storage device into alternating current (AC) power, and to output the AC power to a power system.

BACKGROUND

A power conversion device is conventionally known that converts DC power stored in an electrical storage device into AC power, and outputs the AC power to a power system (see, e.g., Patent Literature 1). Patent Literature 1 discloses a power generation control device including a charge-discharge control unit that controls charging and discharging of an electrical storage device connected to a power distribution system, based on a system voltage value of the power distribution system and on an output power value of a solar power generation device connected to the power distribution system.

The charge-discharge control unit includes a total output upper limit determination unit that provides a fixed total output upper limit value for a combination of the solar power generation device and the electrical storage device when the system voltage value is less than a threshold, and reduces the total output upper limit value as the system voltage value increases from the threshold or higher. The charge-discharge control unit also includes a charge-discharge command value computation unit that calculates a charge-discharge command value for the electrical storage device based on the total output upper limit value and on the output power value of the solar power generation device. The power generation control device disclosed in Patent Literature 1 includes a reactive power control unit that controls reactive power supplied to the power distribution system, based on the system voltage value and on the charge-discharge command value.

CITATION LIST

Patent Literature

Patent Literature 1: Japanese Patent Application Laid-open No. 2013-165593

SUMMARY

Technical Problem

The power generation control device disclosed in Patent Literature 1 determines a command value for the active power and a command value for the reactive power each output by the power generation control device, based on the system voltage value, on the output power value of the solar power generation device, and on a load power consumption value. Accordingly, the power generation control device is incapable of supplying active power and reactive power to a power distribution system based on a command from outside the power generation control device. In addition, the power generation control device disclosed in Patent Literature 1 calculates an active power value and a reactive power value based on the system voltage value. That is, the power generation control device disclosed in Patent Literature 1 is incapable of outputting the power taking into account the power output from the electrical storage device connected to the power generation control device, the power consumption of the load, and an external command.

The present invention has been made in view of the foregoing, and it is an object of the present invention to provide a power conversion device that outputs power taking into account the power output from the electrical storage device connected thereto, the power consumption of the load, and a command value supplied from an external controller.

Solution to Problem

To solve the problem and achieve the object described above, the present invention is directed to a power conversion device including a power converter connected to an electrical storage device that stores direct current (DC) power, and having a function to convert the DC power stored in the electrical storage device into alternating current (AC) power, and also having a function to output the AC power to one or both of a customer load and a power system; a detection unit that detects voltage and current at a first point on a power line that connects the power converter with the power system; and a control unit that generates a drive command for controlling the power converter based on the voltage and on the current detected by the detection unit. The customer load is connected to a second point, on the power line, between the power converter and the first point. The power converter operates on a basis of the drive command generated by the control unit. The control unit includes a computation unit that calculates an active power value and a reactive power value of a tidal power based on the voltage and on the current detected by the detection unit; an active power command generation unit that generates a command value for an output of active power based on an active power command value supplied from an external controller disposed outside the power conversion device, and on the active power value calculated by the computation unit; a reactive power command generation unit that generates a command value for an output of reactive power based on a reactive power command value supplied from the external controller and on the reactive power value calculated by the computation unit; and a drive command generation unit that generates the drive command based on one or both of the command value for an output of active power generated by the active power command generation unit and the command value for an output of reactive power generated by the reactive power command generation unit.

Advantageous Effects of Invention

The present invention provides an advantage in being capable of outputting power taking into account the power output from the electrical storage device connected thereto, the power consumption of the load, and a command value supplied from an external controller.

DESCRIPTION OF EMBODIMENTS

A power conversion device according to embodiments of the present invention will be described in detail below with reference to the drawings. Note that these embodiments are not intended to limit the scope of this invention.

First Embodiment

Figure 1:
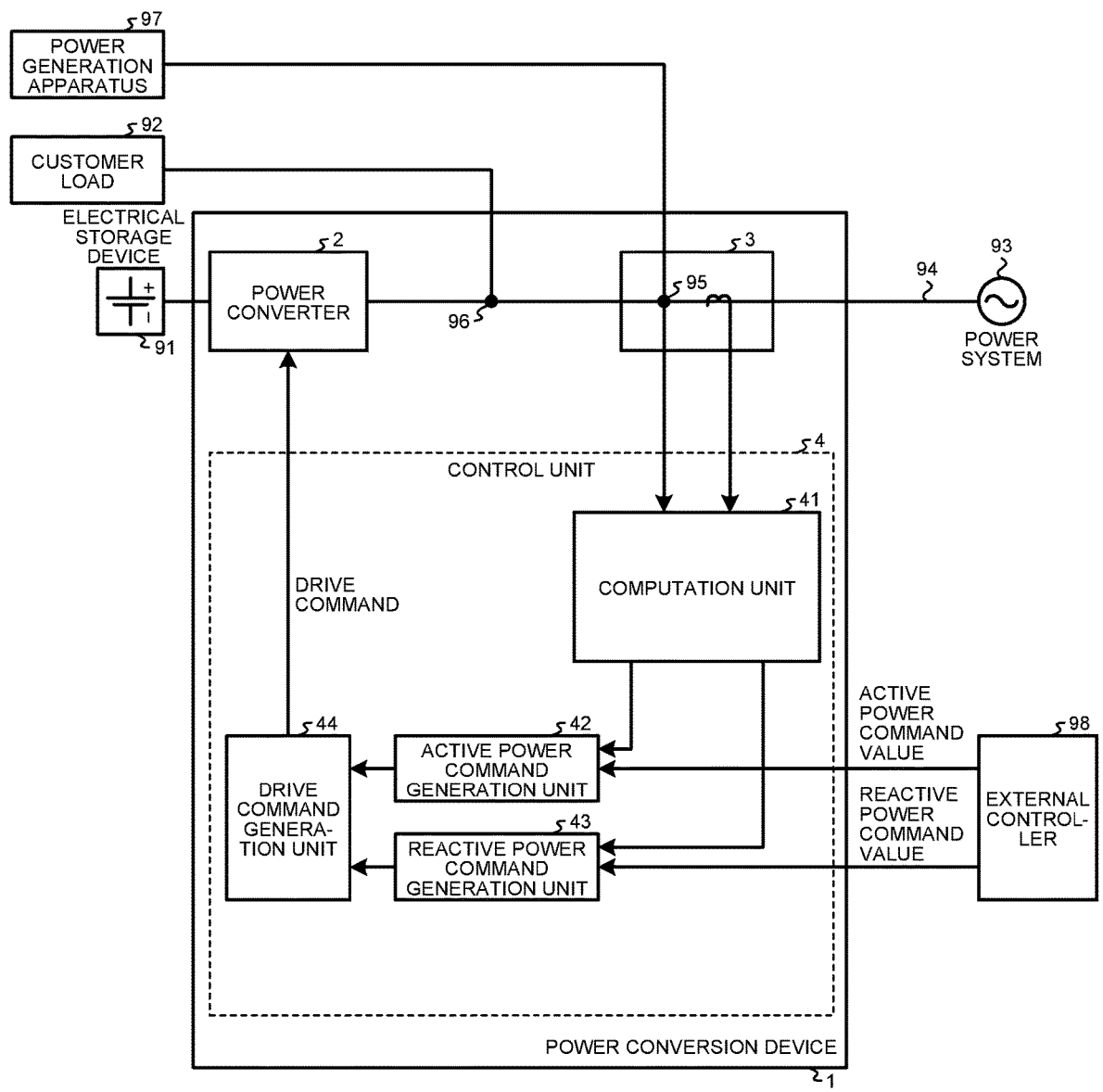
FIG. 1 is a first diagram illustrating a configuration of a power conversion device according to a first embodiment.

A configuration of a power conversion device 1 according to a first embodiment will first be described. FIG. 1 is a first diagram illustrating the configuration of the power conversion device 1 according to the first embodiment. The power conversion device 1 is a device installed, for example, in a residence; and is a device having a function to convert DC power stored in an electrical storage device 91, which stores DC power, into AC power, and to output the AC power to one or both of a customer load 92 and a power system 93. FIG. 1 also illustrates the electrical storage device 91, the customer load 92, and the power system 93. Examples of the customer load 92 include an air conditioner and a refrigerator.

The power conversion device 1 includes a power converter 2 connected to the electrical storage device 91, and having a function to convert the DC power stored in the electrical storage device 91 into AC power, and also having a function to output the AC power to one or both of the customer load 92 and the power system 93. For example, the power converter 2 includes an inverter circuit. The power conversion device 1 also includes a detection unit 3, which detects voltage and current at a first point 95 on a power line 94 that connects the power converter 2 with the power system 93 for calculating a tidal power between the power converter 2 and the power system 93. Note that FIG. 1 illustrates the detection unit 3 only by the frame of a block that represents functions of the detection unit 3. The power conversion device 1 also includes a control unit 4, which generates a drive command for controlling the power converter 2 based on the voltage and on the current detected by the detection unit 3.

The customer load 92 is connected to the power line 94. In more detail, the customer load 92 is connected to a second point 96, on the power line 94, positioned between the power converter 2 and the first point 95. The power converter 2 operates on the basis of the drive command generated by the control unit 4. A power generation apparatus 97 that outputs AC power is connected to the first point 95. FIG. 1 also illustrates the power generation apparatus 97. For example, the power generation apparatus 97 generates DC power by solar power generation, converts the DC generated power into AC power, and supplies the AC power obtained by the conversion to the power line 94. Note that the power generation apparatus 97 may not necessarily be connected to the first point 95.

The control unit 4 includes a computation unit 41, which calculates an active power value and a reactive power value of the tidal power based on the voltage and on the current detected by the detection unit 3. The control unit 4 also includes an active power command generation unit 42, which generates a command value for an output of active power based on an active power command value supplied from an external controller 98 disposed outside the power conversion device 1 and on the active power value calculated by the computation unit 41. The external controller 98 is a device that supplies a command value for controlling the power converter 2 to the power conversion device 1. The active power command value is the command value for controlling the power converter 2. The command value for an output of active power generated by the active power command generation unit 42 is one for forcing the tidal power to follow the active power command value. The functions of the active power command generation unit 42 will be described in detail later with reference to FIG. 2.

The control unit 4 also includes a reactive power command generation unit 43, which generates a command value for an output of reactive power based on a reactive power command value supplied from the external controller 98 and on the reactive power value calculated by the computation unit 41. The reactive power command value is a command value for controlling the power converter 2. The command value for an output of reactive power generated by the reactive power command generation unit 43 is one for forcing the tidal power to follow the reactive power command value. The functions of the reactive power command generation unit 43 will be described in detail later with reference to FIG. 2.

The control unit 4 also includes a drive command generation unit 44, which generates a drive command based on the command value for an output of active power generated by the active power command generation unit 42 and on the command value for an output of reactive power generated by the reactive power command generation unit 43. Specifically, the drive command generation unit 44 adds the command value for an output of reactive power generated by the reactive power command generation unit 43 to the command value for an output of active power generated by the active power command generation unit 42 to generate the drive command.

Figure 2:
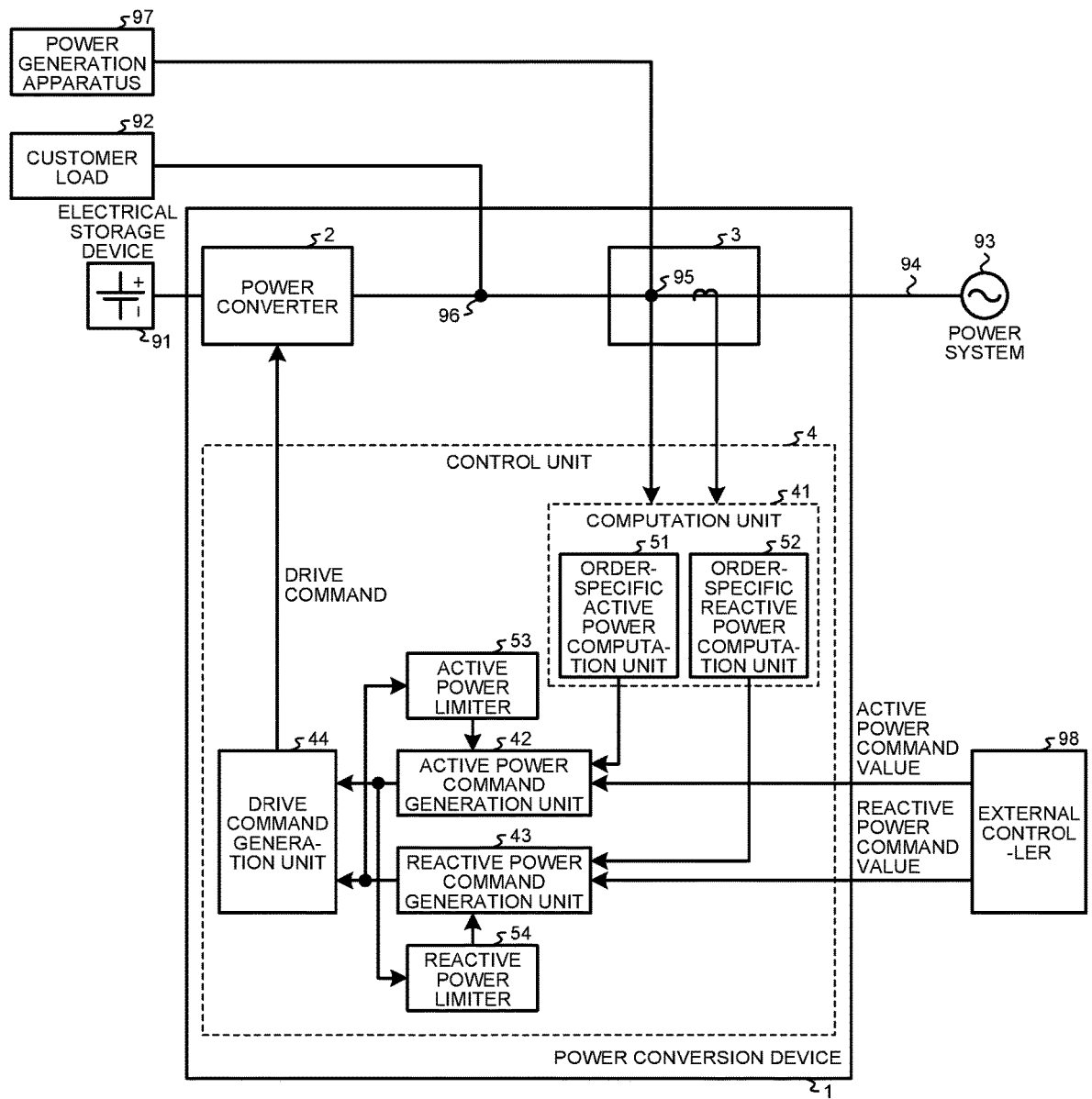
FIG. 2 is a second diagram illustrating the configuration of the power conversion device according to the first embodiment.

FIG. 2 is a second diagram illustrating the configuration of the power conversion device 1 according to the first embodiment. FIG. 2 illustrates details of the control unit 4 illustrated in FIG. 1. The computation unit 41 included in the control unit 4 includes an order-specific active power computation unit 51, which calculates an active power value at the frequency of the AC power of the power system 93, and one or more active power values at respective multiplied frequencies obtained by multiplication of the above frequency by respective number(s) ranging from 2 to a predetermined integer greater than or equal to 2, based on the voltage and on the current detected by the detection unit 3. That is, the order-specific active power computation unit 51 calculates an active power value at the frequency of the AC power of the power system 93, and one or more active power values at respective multiplied frequencies based on the above frequency. The frequency of the AC power of the power system 93 may hereinafter be referred to as "reference frequency".

The computation unit 41 also includes an order-specific reactive power computation unit 52, which calculates a reactive power value at the frequency of the AC power of the power system 93, and one or more reactive power values at respective multiplied frequencies obtained by multiplication of the above frequency by respective number(s) ranging from 2 to a predetermined integer greater than or equal to 2, based on the voltage and on the current detected by the detection unit 3. That is, the order-specific reactive power computation unit 52 calculates a reactive power value at the frequency of the AC power of the power system 93, and one or more reactive power values at respective multiplied frequencies based on the above frequency.

The active power command generation unit 42 generates the command value for an output of active power described above based on the active power command value supplied from the external controller 98, and on the active power value at the above frequency and on the one or more active power values at the respective multiplied frequencies, calculated by the order-specific active power computation unit 51. Specifically, the active power command generation unit 42 subtracts, from the active power command value, the active power value at the reference frequency and the one or more active power values at the respective multiplied frequencies calculated by the order-specific active power computation unit 51 to respectively calculate deviations for the respective orders, and then provides control, such as proportional integral (PI) control, for the respective orders to reduce these deviations thus to generate the command value for an output of active power.

The active power command generation unit 42 may generate the command value for an output of active power described above based on the active power command value and on the active power value at the above frequency calculated by the order-specific active power computation unit 51. Specifically, the active power command generation unit 42 may subtract, from the active power command value, the active power value at the reference frequency calculated by the order-specific active power computation unit 51 to calculate a deviation for each order, and then provide control such as PI control for each order to reduce this deviation thus to generate the command value for an output of active power.

The reactive power command generation unit 43 generates the command value for an output of reactive power described above based on the reactive power command value supplied from the external controller 98, and on the reactive power value at the above frequency and on the one or more reactive power values at the respective multiplied frequencies calculated by the order-specific reactive power computation unit 52. Specifically, the reactive power command generation unit 43 subtracts, from the reactive power command value, the reactive power value at the reference frequency and the one or more reactive power values at the respective multiplied frequencies calculated by the order-specific reactive power computation unit 52 to respectively calculate deviations for the respective orders, and then provides control such as PI control for the respective orders to reduce these deviations thus to generate the command value for an output of reactive power.

The reactive power command generation unit 43 may generate the command value for an output of reactive power described above based on the reactive power command value and on the reactive power value at the above frequency calculated by the order-specific reactive power computation unit 52. Specifically, the reactive power command generation unit 43 may subtract, from the reactive power command value, the reactive power value at the reference frequency calculated by the order-specific reactive power computation unit 52 to calculate a deviation for each order, and then provide control such as PI control for each order to reduce this deviation thus to generate the command value for an output of reactive power.

The control unit 4 also includes an active power limiter 53 which sets an upper setting limit, which is an upper limit of the command value for an output of active power, based on the reactive power command value supplied from the external controller 98, and on an upper limit value of apparent power that can be output by the power converter 2. The active power command generation unit 42 generates a command value for an output of active power less than or equal to the upper setting limit set by the active power limiter 53.

The control unit 4 also includes a reactive power limiter 54 which sets an upper setting limit, which is an upper limit of the command value for an output of reactive power, based on the active power command value supplied from the external controller 98, and on an upper limit value of apparent power that can be output by the power converter 2. The reactive power command generation unit 43 generates a command value for an output of reactive power less than or equal to the upper setting limit set by the reactive power limiter 54.

Figure 3:
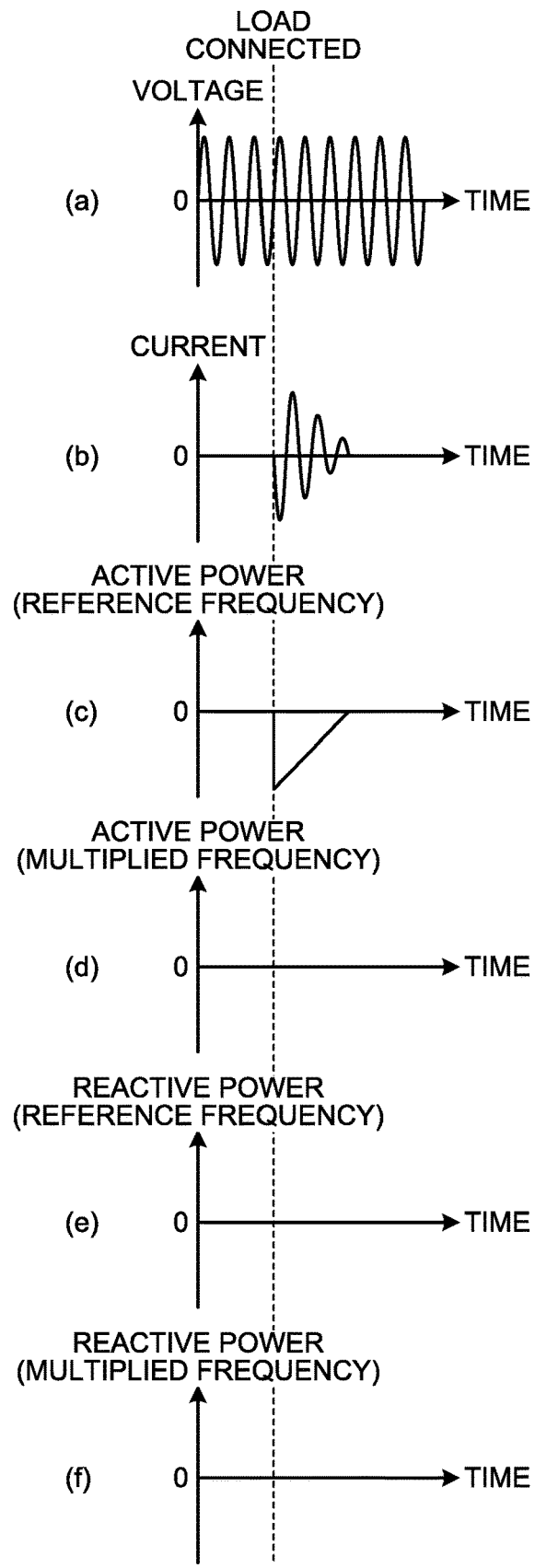
FIG. 3 is a diagram illustrating an example of waveforms of voltage and of current related to a tidal power and waveforms of the tidal power in a case in which a customer load is a resistive load, and the customer load is connected to a power converter of the power conversion device according to the first embodiment.

An operation of the power conversion device 1 will next be described. That is, a tidal power control method performed by the power conversion device 1 will be described. FIG. 3 is a diagram illustrating an example of waveforms of the voltage and of the current related to the tidal power and waveforms of the tidal power in a case in which the customer load 92 is a resistive load, and the customer load 92 is connected to the power converter 2 of the power conversion device 1 according to the first embodiment. Referring to FIG. 3, a tidal power control method when the customer load 92 is connected to the power converter 2 will be described. FIG. 3 indicates the time in which the customer load 92 is connected to the power converter 2 by a phrase of "Load Connected".

In FIG. 3, the current polarity is defined such that the direction in which a current flows from the power converter 2 and from the power generation apparatus 97 to the power system 93 is the positive direction. The polarity of active power is defined such that the direction of discharging from the power converter 2 and from the power generation apparatus 97 to the power system 93 is the positive direction. The direction of discharging is the direction of selling electric power. The polarity of reactive power is defined such that the direction of discharging phase-advanced reactive power from the power converter 2 and from the power generation apparatus 97 to the power system 93 is the positive direction. For ease of illustration of the control method, it is assumed hereinafter that the active power command value and the reactive power command value supplied from the external controller 98 are each zero.

FIG. 3(*a*) is a diagram illustrating a waveform of the voltage detected by the detection unit 3. FIG. 3(*b*) is a diagram illustrating a waveform of the current detected by the detection unit 3. FIG. 3(*c*) is a diagram illustrating the active power value at the reference frequency. As illustrated in FIG. 3(*c*), connection of the customer load 92 to the power converter 2 results in an increase in the active power at the reference frequency in the negative direction, i.e., in the direction of purchasing electric power.

The order-specific active power computation unit 51 calculates the active power value at the reference frequency that varies due to the connection of the customer load 92 to the power converter 2, based on the voltage and on the current detected by the detection unit 3. The order-specific active power computation unit 51 calculates the active power value at the reference frequency including the polarity. For example, the order-specific active power computation unit 51 calculates the active power value at the reference frequency including the polarity that indicates either a discharging or charging state. Similarly, the order-specific active power computation unit 51 calculates the one or more active power values at respective multiplied frequencies each including the polarity.

Specifically, the order-specific active power computation unit 51 calculates the active power value at the reference frequency and the one or more active power values at the respective multiplied frequencies by performing Fourier transform on each of the voltage detected by the detection unit 3 and the current detected by the detection unit 3, or by applying a filtering operation to reduce values in bands other than a specific frequency band.

The upper limit of the range of the multiplied frequencies depends, for example, on a detection characteristic of the detection unit 3 or on a power output characteristic of the power converter 2. The detection characteristic of the detection unit 3 is, for example, a characteristic with respect to accuracy or the detection time. The power output characteristic of the power converter 2 is, for example, a characteristic with respect to accuracy or the response time of the output power. For example, the order-specific active power computation unit 51 calculates the active power values up to the seventh-order multiplied frequency, which is the frequency seven times as high as the reference frequency. The upper limit of the range of the multiplied frequencies may also be determined by a characteristic of the customer load 92. For example, in a case in which the customer load 92 is a capacitor compliant to JIS C 61000-3-2, the order-specific active power computation unit 51 calculates the active power values up to the thirteenth-order multiplied frequency, which is the frequency 13 times as high as the reference frequency.

The active power command generation unit 42 generates the command value for an output of active power for each of the reference frequency and the one or more multiplied frequencies to reduce the differences between respective ones of the active power value at the reference frequency and the one or more active power values at the respective multiplied frequencies calculated by the order-specific active power computation unit 51, and the active power command value supplied from the external controller 98. The active power command generation unit 42 may receive the active power command value from the external controller 98 for each of the reference frequency and the one or more multiplied frequencies. The active power command generation unit 42 may determine that the active power command value at a frequency other than a specific frequency is zero among the active power command values supplied from the external controller 98, and receive only the active power command value at the specific frequency. One example of the specific frequency is the reference frequency.

FIG. 3(*d*) is a diagram illustrating the active power value at the multiplied frequency or frequencies. FIG. 3(*e*) is a diagram illustrating the reactive power value at the reference frequency. FIG. 3(*f*) is a diagram illustrating the reactive power value at the multiplied frequency or frequencies. As illustrated in FIGS. 3(*e*) and 3(*f*), the reactive power value at the reference frequency and the reactive power value at the multiplied frequency or frequencies do not change. Therefore, the reactive power value calculated by the order-specific reactive power computation unit 52 is 0 Var. Because the reactive power command value supplied from the external controller 98 is also 0 Var, the reactive power command value generated by the reactive power command generation unit 43 is 0 Var.

The drive command generation unit 44 generates the drive command based on the command value for an output of active power generated by the active power command generation unit 42 and on the command value for an output of reactive power generated by the reactive power command generation unit 43. Specifically, the drive command generation unit 44 adds the command value for an output of reactive power generated by the reactive power command generation unit 43 to the command value for an output of active power generated by the active power command generation unit 42 to generate the drive command. The power converter 2 operates on the basis of the drive command generated by the drive command generation unit 44. Operation of the power converter 2 on the basis of the drive command allows the tidal power to follow the active power command value and the reactive power command value supplied from the external controller 98.

The tidal power control method when the customer load 92 that is a resistive load is connected to the power converter 2 as described above with reference to FIG. 3 is also applicable as a tidal power control method to be performed by the power conversion device 1 in a case in which the customer load 92 that is a resistive load is disconnected from the power converter 2, and in a case in which the active power value at the reference frequency of the power generation apparatus 97 varies.

Figure 4:
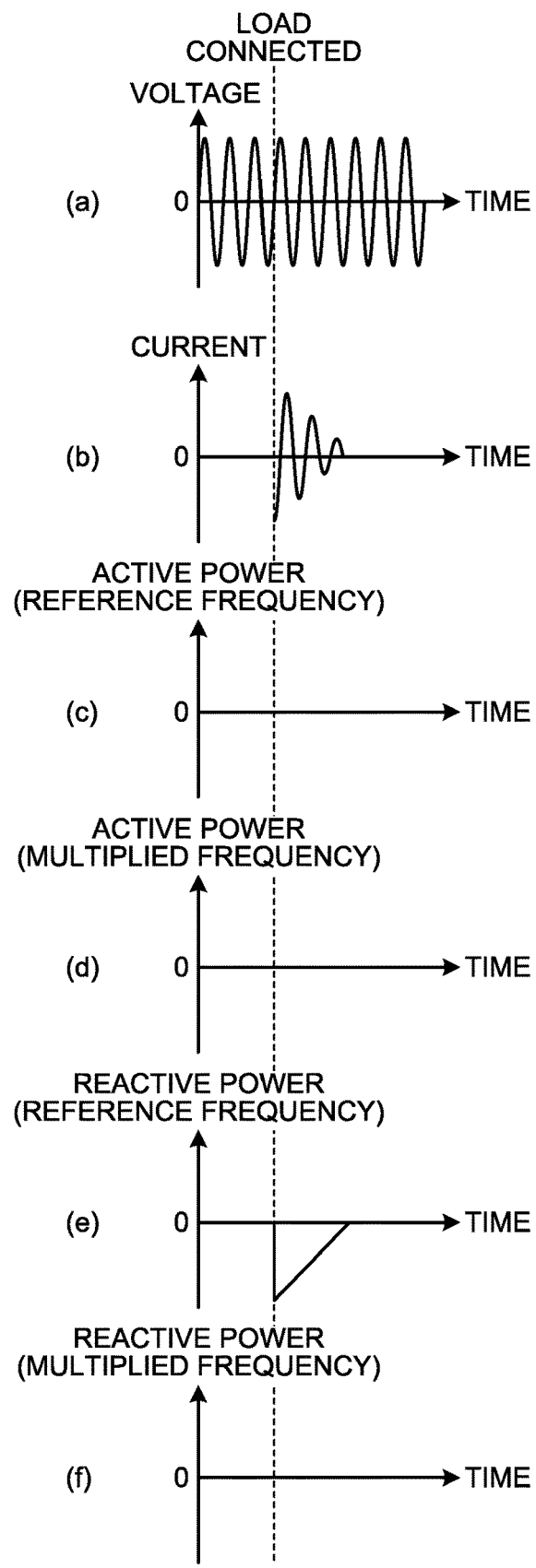
FIG. 4 is a diagram illustrating an example of waveforms of voltage and of current related to the tidal power and waveforms of the tidal power in a case in which the customer load is a capacitor load, and the customer load is connected to the power converter of the power conversion device according to the first embodiment.

FIG. 4 is a diagram illustrating an example of waveforms of the voltage and of the current related to the tidal power and waveforms of the tidal power in a case in which the customer load 92 is a capacitor load, and the customer load 92 is connected to the power converter 2 of the power conversion device 1 according to the first embodiment. Referring to FIG. 4, a tidal power control method when the customer load 92 that is a capacitor load is connected to the power converter 2 will be described. The respective meanings of polarity and of the phrase of "Load Connected" of FIG. 4 are the same as the meanings described in relation to FIG. 3.

FIG. 4($a$) is a diagram illustrating a waveform of the voltage detected by the detection unit 3. FIG. 4($b$) is a diagram illustrating a waveform of the current detected by the detection unit 3. FIG. 4($c$) is a diagram illustrating the active power value at the reference frequency. FIG. 4($d$) is a diagram illustrating the active power value at the multiplied frequency or frequencies. FIG. 4($e$) is a diagram illustrating the reactive power value at the reference frequency. FIG. 4($f$) is a diagram illustrating the reactive power value at the multiplied frequency or frequencies. As illustrated in FIG. 4($e$), connection of the customer load 92 to the power converter 2 results in an increase in the reactive power at the reference frequency in the negative direction, i.e., in the direction of purchasing electric power.

The order-specific reactive power computation unit 52 calculates the reactive power value at the reference frequency that varies due to the connection of the customer load 92 to the power converter 2, based on the voltage and on the current detected by the detection unit 3. The order-specific reactive power computation unit 52 calculates the reactive power value at the reference frequency including the polarity. For example, the order-specific reactive power computation unit 52 calculates the reactive power value at the reference frequency including the polarity that indicates either a discharging or charging state. Similarly, the order-specific reactive power computation unit 52 calculates the one or more reactive power values at respective multiplied frequencies each including the polarity.

Specifically, similarly to when the order-specific active power computation unit 51 calculates the active power value, the order-specific reactive power computation unit 52 calculates the reactive power value at the reference frequency and the one or more reactive power values at the respective multiplied frequencies by performing Fourier transform on each of the voltage detected by the detection unit 3 and the current detected by the detection unit 3, or by applying a filtering operation to reduce values in bands other than a specific frequency band.

Similarly to when the order-specific active power computation unit 51 calculates the active power values, the upper limit of the range of the multiplied frequencies depends, for example, on a detection characteristic of the detection unit 3 or on a power output characteristic of the power converter 2. The detection characteristic of the detection unit 3 is, for example, a characteristic with respect to accuracy or the detection time. The power output characteristic of the power converter 2 is, for example, a characteristic with respect to accuracy or the response time of the output power. For example, the order-specific reactive power computation unit 52 calculates the reactive power values up to the seventh-order multiplied frequency, which is the frequency seven times as high as the reference frequency. The upper limit of the range of the multiplied frequencies may also be determined by a characteristic of the customer load 92. For example, in a case in which the customer load 92 is a capacitor compliant to JIS C 61000-3-2, the order-specific reactive power computation unit 52 calculates the reactive power values up to the thirteenth-order multiplied frequency, which is the frequency 13 times as high as the reference frequency.

The reactive power command generation unit 43 generates the command value for an output of reactive power for each of the reference frequency and the one or more multiplied frequencies to reduce the differences between respective ones of the reactive power value at the reference frequency and the one or more reactive power values at the respective multiplied frequencies calculated by the order-specific reactive power computation unit 52, and the reactive power command value supplied from the external controller 98. The reactive power command generation unit 43 may receive the reactive power command value from the external controller 98 for each of the reference frequency and the one or more multiplied frequencies. The reactive power command generation unit 43 may determine that the reactive power command value at a frequency other than a specific frequency is zero among the reactive power command values supplied from the external controller 98, and receive only the reactive power command value at the specific frequency. One example of the specific frequency is the reference frequency.

As illustrated in FIGS. 4($c$) and 4($d$), the active power value at the reference frequency and the active power value at the multiplied frequency or frequencies do not change. Therefore, the active power value calculated by the order-specific active power computation unit 51 is 0 W. Because the active power command value supplied from the external controller 98 is also 0 W, the active power command value generated by the active power command generation unit 42 is 0 W.

The drive command generation unit 44 generates the drive command based on the command value for an output of active power generated by the active power command generation unit 42 and on the command value for an output of reactive power generated by the reactive power command generation unit 43. Specifically, the drive command generation unit 44 adds the command value for an output of reactive power generated by the reactive power command generation unit 43 to the command value for an output of active power generated by the active power command generation unit 42 to generate the drive command. The power converter 2 operates on the basis of the drive command generated by the drive command generation unit 44. Operation of the power converter 2 on the basis of the drive command allows the tidal power to follow the active power command value and the reactive power command value supplied from the external controller 98.

The tidal power control method when the customer load 92 that is a capacitor load is connected to the power converter 2 as described above with reference to FIG. 4 is also applicable as a tidal power control method to be performed by the power conversion device 1 in a case in which the customer load 92 that is a capacitor load is disconnected from the power converter 2, in a case in which the customer load 92 is an inductive load, and the customer load 92 is connected to the power converter 2, in a case in which the customer load 92 is an inductive load, and the customer load 92 is disconnected from the power converter 2, and in a case in which the reactive power value at the reference frequency of the power generation apparatus 97 varies.

Figure 5:
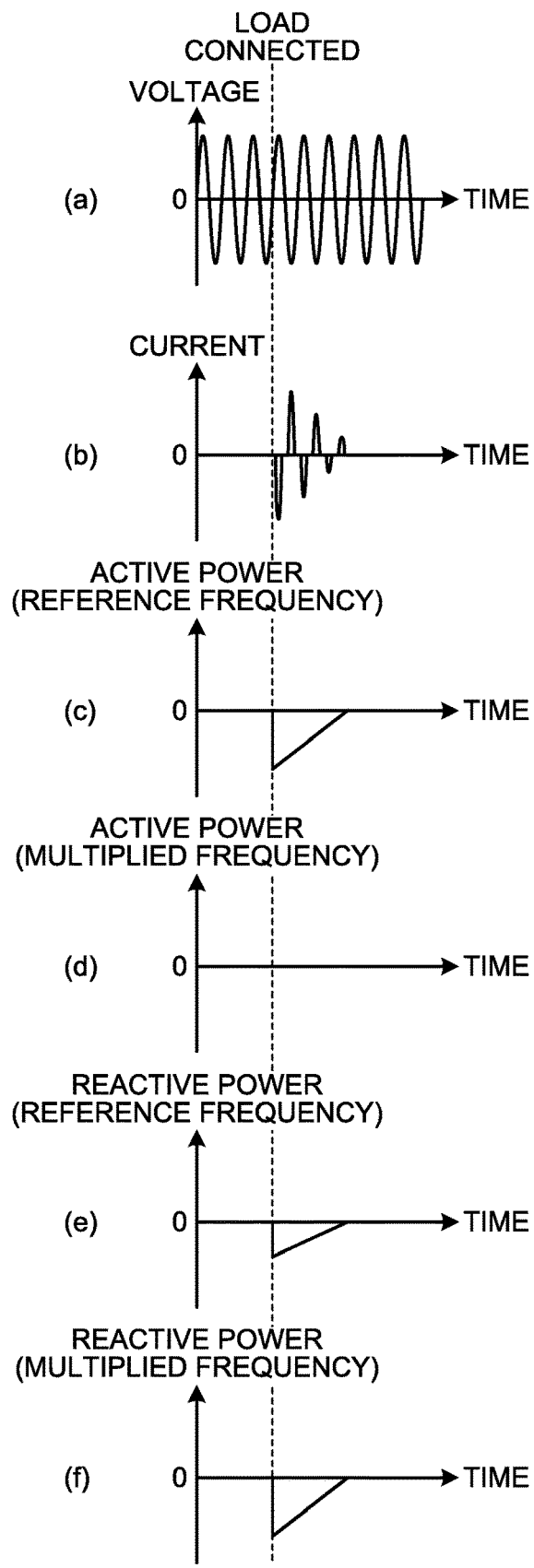
FIG. 5 is a diagram illustrating an example of waveforms of voltage and of current related to the tidal power and waveforms of the tidal power in a case in which the customer load is a harmonic generating load, and the customer load is connected to the power converter of the power conversion device according to the first embodiment.

FIG. 5 is a diagram illustrating an example of waveforms of the voltage and of the current related to the tidal power and waveforms of the tidal power in a case in which the customer load 92 is a harmonic generating load, and the customer load 92 is connected to the power converter 2 of the power conversion device 1 according to the first embodiment. One example of the harmonic generating load is a capacitive input load. Referring to FIG. 5, a tidal power control method when the customer load 92 that is a harmonic generating load is connected to the power converter 2 will be described. The respective meanings of polarity and of the phrase of "Load Connected" of FIG. 5 are the same as the meanings described in relation to FIG. 3.

FIG. 5(a) is a diagram illustrating a waveform of the voltage detected by the detection unit 3. FIG. 5(b) is a diagram illustrating a waveform of the current detected by the detection unit 3. FIG. 5(c) is a diagram illustrating the active power value at the reference frequency. FIG. 5(d) is a diagram illustrating the active power value at the multiplied frequency or frequencies. FIG. 5(e) is a diagram illustrating the reactive power value at the reference frequency. FIG. 5(f) is a diagram illustrating the reactive power value at the multiplied frequency or frequencies. As illustrated in FIGS. 5(c), 5(e), and 5(f), connection of the customer load 92 to the power converter 2 results in a change over time in the active power value at the reference frequency, in the reactive power value at the reference frequency, and in the reactive power value at the multiplied frequency or frequencies.

The order-specific active power computation unit 51 calculates the active power value at the reference frequency that varies due to the connection of the customer load 92 to the power converter 2, based on the voltage and on the current detected by the detection unit 3. The order-specific reactive power computation unit 52 calculates the reactive power value at the reference frequency and the reactive power value at the multiplied frequency or frequencies, that vary due to the connection of the customer load 92 to the power converter 2, based on the voltage and on the current detected by the detection unit 3. The order-specific active power computation unit 51 operates similarly to the order-specific active power computation unit 51 described with reference to FIG. 3. The order-specific reactive power computation unit 52 operates similarly to the order-specific reactive power computation unit 52 described with reference to FIG. 4.

The active power command generation unit 42 generates the command value for an output of active power for each of the reference frequency and the one or more multiplied frequencies to reduce the differences between respective ones of the active power value at the reference frequency and the one or more active power values at the respective multiplied frequencies calculated by the order-specific active power computation unit 51, and the active power command value supplied from the external controller 98. The reactive power command generation unit 43 generates the command value for an output of reactive power for each of the reference frequency and the one or more multiplied frequencies to reduce the differences between respective ones of the reactive power value at the reference frequency and the one or more reactive power values at the respective multiplied frequencies calculated by the order-specific reactive power computation unit 52, and the reactive power command value supplied from the external controller 98.

The drive command generation unit 44 generates the drive command based on the command value for an output of active power generated by the active power command generation unit 42 and on the command value for an output of reactive power generated by the reactive power command generation unit 43. Specifically, the drive command generation unit 44 adds the command value for an output of reactive power generated by the reactive power command generation unit 43 to the command value for an output of active power generated by the active power command generation unit 42 to generate the drive command. The power converter 2 operates on the basis of the drive command generated by the drive command generation unit 44. Operation of the power converter 2 on the basis of the drive command allows the tidal power to follow the active power command value and the reactive power command value supplied from the external controller 98.

The tidal power control method when the customer load 92 that is a harmonic generating load is connected to the power converter 2 as described above with reference to FIG. 5 is also applicable as a tidal power control method to be performed by the power conversion device 1 in a case in which the customer load 92 that is a harmonic generating load is disconnected from the power converter 2, and in a case in which a harmonic component in the AC power generated by the power generation apparatus 97 varies.

Figure 6:
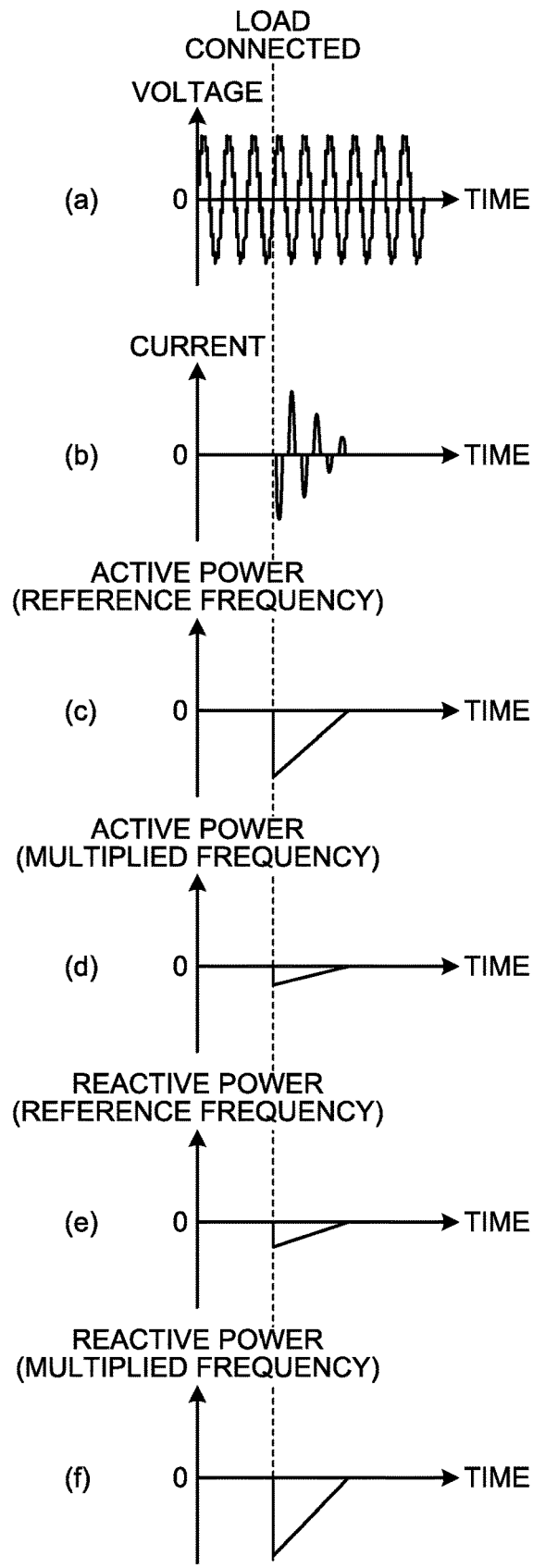
FIG. 6 is a diagram illustrating an example of waveforms of voltage and of current related to the tidal power and waveforms of the tidal power in a case in which the customer load is a harmonic generating load, and the customer load is connected to the power converter of the power conversion device when a harmonic component is contained in the voltage detected by a detection unit of the power conversion device according to the first embodiment.

FIG. 6 is a diagram illustrating an example of waveforms of the voltage and of the current related to the tidal power and waveforms of the tidal power in a case in which the customer load 92 is a harmonic generating load, and the customer load 92 is connected to the power converter 2 of the power conversion device 1 when a harmonic component is contained in the voltage detected by the detection unit 3 of the power conversion device 1 according to the first embodiment. Referring to FIG. 6, a tidal power control method when the customer load 92 that is a harmonic generating load is connected to the power converter 2 will be described. The respective meanings of polarity and of the phrase of "Load Connected" of FIG. 6 are the same as the meanings described in relation to FIG. 3.

FIG. 6(a) is a diagram illustrating a waveform of the voltage detected by the detection unit 3. FIG. 6(b) is a diagram illustrating a waveform of the current detected by the detection unit 3. FIG. 6(c) is a diagram illustrating the active power value at the reference frequency. FIG. 6(d) is a diagram illustrating the active power value at the multiplied frequency or frequencies. FIG. 6(e) is a diagram illustrating the reactive power value at the reference frequency. FIG. 6(f) is a diagram illustrating the reactive power value at the multiplied frequency or frequencies. As illustrated in FIGS. 6(c), 6(d), 6(e), and 6(f), when the voltage detected by the detection unit 3 contains a harmonic component, connection of the customer load 92 that is a harmonic generating load to the power converter 2 results in a change over time in the active power value at the reference frequency, in the active power value at the multiplied frequency or frequencies, in the reactive power value at the reference frequency, and in the reactive power value at the multiplied frequency or frequencies depending on the characteristic of the customer load 92.

The active power command generation unit 42 generates the command value for an output of active power for each of the reference frequency and the one or more multiplied frequencies to reduce the differences between respective ones of the active power value at the reference frequency and the one or more active power values at the respective multiplied frequencies calculated by the order-specific active power computation unit 51, and the active power command value supplied from the external controller 98. The reactive power command generation unit 43 generates the command value for an output of reactive power for each of the reference frequency and the one or more multiplied frequencies to reduce the differences between respective ones of the reactive power value at the reference frequency and the one or more reactive power values at the respective multiplied frequencies calculated by the order-specific reactive power computation unit 52, and the reactive power command value supplied from the external controller 98.

The drive command generation unit 44 generates the drive command based on the command value for an output of active power generated by the active power command generation unit 42 and on the command value for an output of reactive power generated by the reactive power command generation unit 43. Specifically, the drive command generation unit 44 adds the command value for the output of reactive power generated by the reactive power command generation unit 43 to the command value for an output of active power generated by the active power command generation unit 42 to generate the drive command. The power converter 2 operates on the basis of the drive command generated by the drive command generation unit 44. Operation of the power converter 2 on the basis of the drive command allows the tidal power to follow the active power command value and the reactive power command value supplied from the external controller 98.

The tidal power control method when the customer load 92 that is a harmonic generating load is connected to the power converter 2 as described above with reference to FIG. 6 is also applicable as a tidal power control method to be performed by the power conversion device 1 in a case in which the customer load 92 that is a harmonic generating load is disconnected from the power converter 2, and in a case in which a harmonic component in the AC power generated by the power generation apparatus 97 varies.

The power converter 2 cannot output power which exceeds an upper limit value of the apparent power. As described above, the control unit 4 includes the active power limiter 53 and the reactive power limiter 54. In a case in which the power converter 2 gives priority to outputting the active power, the active power limiter 53 operates, while the reactive power limiter 54 does not operate. In a case in which the power converter 2 gives priority to outputting the reactive power, the reactive power limiter 54 operates, while the active power limiter 53 does not operate.

In a case in which the power converter 2 gives priority to outputting the active power, the active power limiter 53 sets an upper limit of the command value for an output of the active power, which is a first upper setting limit, to a value "Plim" given in Formula (1) below. The case in which the power converter 2 gives priority to outputting the active power is a case in which priority is given to following the command value for an output of the active power over following the command value for an output of the reactive power. In Formula (1), "Plim" represents the first upper setting limit set by the active power limiter 53, and "Slim" represents the upper limit value of the apparent power.

[Formula 1]

$$Plim = Slim \quad (1)$$

That is, the command value for an output of the active power generated by the active power command generation unit 42 is limited to less than or equal to the value "Plim" given by Formula (1).

In a case in which the power converter 2 gives priority to outputting the active power, the reactive power limiter 54 calculates a value "Qlim" given by Formula (2) below, and sets the upper limit of the command value for an output of the reactive power, which is a second upper setting limit, to the value "Qlim" given by Formula (2). In Formula (2), "Qlim" represents the second upper setting limit set by the reactive power limiter 54, and "Pref" represents the active power command value supplied from the external controller 98.

[Formula 2]

$$Qlim = \sqrt{Slim^2 - Pref^2} \quad (2)$$

That is, the command value for an output of the reactive power generated by the reactive power command generation unit 43 is limited to less than or equal to the value "Qlim" given by Formula (2).

To prevent the power converter 2 from outputting power which exceeds the upper limit value of the apparent power, calculation is performed sequentially in order of the first step, the second step, and the third step as listed below.

First step: operation performed by the active power command generation unit 42

Second step: operation of calculating "Qlim" performed by the reactive power limiter 54

Third step: operation performed by the reactive power command generation unit 43

In a case in which the power converter 2 gives priority to outputting the reactive power, the reactive power limiter 54 sets the upper limit of the command value for an output of the reactive power, which is a third upper setting limit, to a value "Qlim" given in Formula (3) below. The case in which the power converter 2 gives priority to outputting the reactive power is a case in which priority is given to following the command value for an output of the reactive power over following the command value for an output of the active power. In Formula (3), "Qlim" represents the third upper setting limit set by the reactive power limiter 54, and "Slim" represents the upper limit value of the apparent power.

[Formula 3]

$$Qlim = Slim \quad (3)$$

That is, the command value for an output of the reactive power generated by the reactive power command generation unit 43 is limited to less than or equal to the value "Qlim" given by Formula (3).

In a case in which the power converter 2 gives priority to outputting the reactive power, the active power limiter 53 calculates a value "Plim" given by Formula (4) below, and sets the upper limit of the command value for an output of the active power, which is a fourth upper setting limit, to the value "Plim" given by Formula (4). In Formula (4), "Plim" represents the fourth upper setting limit set by the active power limiter 53, and "Qref" represents the reactive power command value supplied from the external controller 98.

[Formula 4]

$$Plim = \sqrt{Slim^2 - Qref^2} \quad (4)$$

That is, the command value for an output of the active power generated by the active power command generation unit 42 is limited to less than or equal to the value "Plim" given by Formula (4).

To prevent the power converter 2 from outputting power which exceeds the upper limit value of the apparent power, calculation is performed sequentially in order of the fourth step, the fifth step, and the sixth step as listed below.

Fourth step: operation performed by the reactive power command generation unit 43

Fifth step: operation of calculating "Plim" performed by the active power limiter 53

Sixth step: operation performed by the active power command generation unit 42

As described above, the power conversion device 1 according to the first embodiment is connected with the electrical storage device 91, and the power conversion device 1 has the function to convert DC power stored in the electrical storage device 91 into AC power. The power conversion device 1 is connected also with the customer load 92 and with the power system 93, and the power conversion device 1 has the function to output the AC power obtained by the conversion to one or both of the customer load 92 and the power system 93. The power conversion device 1 is connected also with the external controller 98. The external controller 98 supplies an active power command value and a reactive power command value to the power conversion device 1.

In a situation where the electrical storage device 91, the customer load 92, the power system 93, and the external controller 98 are connected to the power conversion device 1, the power conversion device 1 detects the voltage and the current at the first point 95 on the power line 94 that connects the power converter 2, which has the function to convert the DC power stored in the electrical storage device 91 into AC power, with the power system 93; and generates a drive command for controlling the power converter 2, based on the voltage and the current detected, and on the active power command value and the reactive power command value supplied from the external controller 98. The power converter 2 operates on the basis of the drive command generated. Thus, the power conversion device 1 is advantageous in being capable of outputting power taking into account the power output from the electrical storage device 91 connected thereto, the power consumption of the customer load 92, and the active power command value and the reactive power command value supplied from the external controller 98.

In more detail, in a situation in which the electrical storage device 91 and the customer load 92 are connected to the power conversion device 1, the power conversion device 1 can allow the tidal power between the power conversion device 1 and the power system 93 to follow the active power command value and the reactive power command value supplied from the external controller 98. Accordingly, the power conversion device 1 can supply active power and reactive power at respective levels needed for the entire power distribution system, to the power system 93.

The power conversion device 1 includes the active power limiter 53 and the reactive power limiter 54. This allows the command value for an output of active power and the command value for an output of reactive power, which originate the drive command, to become values that prevent outputting of power exceeding the upper limit value of the apparent power. This enables the power conversion device 1 to avoid a situation that requires outputting of power exceeding the upper limit value of the apparent power, thereby reducing or preventing occurrence of malfunction in the power conversion device 1.

Note that in the first embodiment described above, the drive command generation unit 44 included in the control unit 4 generates the drive command based on the command value for an output of active power generated by the active power command generation unit 42 and on the command value for an output of reactive power generated by the reactive power command generation unit 43. However, the drive command generation unit 44 may generate the drive command based on one of the command value for an output of active power generated by the active power command generation unit 42 and the command value for an output of reactive power generated by the reactive power command generation unit 43. That is, the drive command generation unit 44 generates the drive command based on one or both of the command value for an output of active power generated by the active power command generation unit 42 and the command value for an output of reactive power generated by the reactive power command generation unit 43.

In a case in which the drive command generation unit 44 generates the drive command based on the command value for an output of active power generated by the active power command generation unit 42, the power conversion device 1 is advantageous in being capable of outputting power taking into account the power output from the electrical storage device 91 connected thereto, the power consumption of the customer load 92, and the active power command value supplied from the external controller 98. In a case in which the drive command generation unit 44 generates the drive command based on the command value for an output of reactive power generated by the reactive power command generation unit 43, the power conversion device 1 is advantageous in being capable of outputting power taking into account the power output from the electrical storage device 91 connected thereto, the power consumption of the customer load 92, and the reactive power command value supplied from the external controller 98.

In addition, in the first embodiment described above, the computation unit 41 included in the control unit 4 calculates the active power value and the reactive power value of the tidal power based on the voltage and on the current detected by the detection unit 3. As long as the active power value and the reactive power value of the tidal power can be calculated, the computation unit 41 may calculate the active power value and the reactive power value of the tidal power based on part or all of the power output by the electrical storage device 91, the power output by the power converter 2, the power consumed in the customer load 92, and the power output by the power generation apparatus 97.

Figure 7:
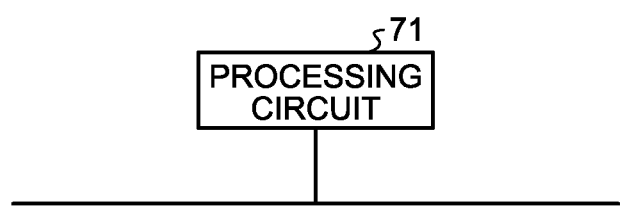
FIG. 7 is a diagram illustrating a processing circuit in a case in which the processing circuit implements at least part of the components included in the detection unit and a control unit included in the power conversion device according to the first embodiment.

FIG. 7 is a diagram illustrating a processing circuit 71 in a case in which the processing circuit 71 implements at least part of the components included in the detection unit 3 and the control unit 4 included in the power conversion device 1 according to the first embodiment. That is, at least part of the functionality of the detection unit 3 and the control unit 4 may be implemented in the processing circuit 71. In more detail, at least part of the functionality of the order-specific active power computation unit 51 and the order-specific reactive power computation unit 52 included in the computation unit 41, and of the computation unit 41, the active power command generation unit 42, the reactive power command generation unit 43, the drive command generation unit 44, the active power limiter 53, and the reactive power limiter 54 included in the control unit 4, may be implemented in the processing circuit 71.

The processing circuit 71 is a dedicated hardware element. The processing circuit 71 is, for example, a single circuit, a set of multiple circuits, a programmed processor, a set of multiple programmed processors, an application specific integrated circuit (ASIC), a field-programmable gate array (FPGA), or a combination thereof. The detection unit 3 and the control unit 4 may be implemented partly in a dedicated hardware element separate from the remainder. In more detail, part of the order-specific active power computation unit 51, the order-specific reactive power computation unit 52, the computation unit 41, the active power command generation unit 42, the reactive power command generation unit 43, the drive command generation unit 44, the active power limiter 53, and the reactive power limiter 54 may be implemented in a dedicated hardware element separate from the remainder.

Figure 8:
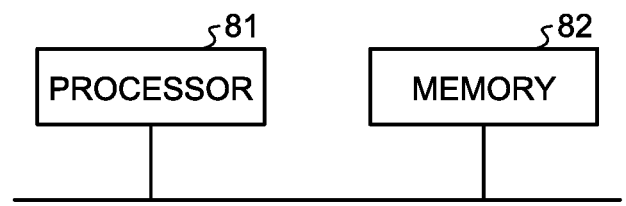
FIG. 8 is a diagram illustrating a processor in a case in which the processor implements at least part of a functionality of the detection unit and the control unit included in the power conversion device according to the first embodiment.

FIG. 8 is a diagram illustrating a processor 81 in a case in which the processor 81 implements at least part of the functionality of the detection unit 3 and the control unit 4 included in the power conversion device 1 according to the first embodiment. That is, at least part of the functionality of the detection unit 3 and the control unit 4 included in the power conversion device 1 may be implemented in the processor 81 that executes a program stored in the memory 82.

In more detail, at least part of the functionality of the order-specific active power computation unit 51, the order-specific reactive power computation unit 52, the computation unit 41, the active power command generation unit 42, the reactive power command generation unit 43, the drive command generation unit 44, the active power limiter 53, and the reactive power limiter 54 may be implemented in the processor 81 that executes a program stored in the memory 82. The processor 81 is a central processing unit (CPU), a processing unit, a computing unit, a microprocessor, a microcomputer, or a digital signal processor (DSP). FIG. 8 also illustrates the memory 82.

In a case in which at least part of the functionality of the detection unit 3 and the control unit 4 is implemented in the processor 81, that part of the functionality is implemented in the processor 81 and in software, firmware, or a combination of software and firmware. In more detail, in a case in which at least part of the functionality of the order-specific active power computation unit 51, the order-specific reactive power computation unit 52, the computation unit 41, the active power command generation unit 42, the reactive power command generation unit 43, the drive command generation unit 44, the active power limiter 53, and the reactive power limiter 54 is implemented in the processor 81, that part of the functionality is implemented in the processor 81 and in software, firmware, or a combination of software and firmware.

The software or firmware is described as programs, and is stored in the memory 82. The processor 81 reads and executes programs stored in the memory 82 to implement at least part of the functionality of the detection unit 3 and the control unit 4. In more detail, the processor 81 reads and executes programs stored in the memory 82 to implement at least part of the functionality of the order-specific active power computation unit 51, the order-specific reactive power computation unit 52, the computation unit 41, the active power command generation unit 42, the reactive power command generation unit 43, the drive command generation unit 44, the active power limiter 53, and the reactive power limiter 54.

That is, in a case in which at least part of the functionality of the detection unit 3 and the control unit 4 is implemented in the processor 81, the power conversion device 1 includes the memory 82 for storing the programs that cause the processor 81 to perform steps to be performed by the at least part of the detection unit 3 and the control unit 4.

In more detail, in a case in which at least part of the functionality of the order-specific active power computation unit 51, the order-specific reactive power computation unit 52, the computation unit 41, the active power command generation unit 42, the reactive power command generation unit 43, the drive command generation unit 44, the active power limiter 53, and the reactive power limiter 54 is implemented in the processor 81, the power conversion device 1 includes the memory 82 for storing the programs that cause the processor 81 to perform steps to be performed by the at least part of the order-specific active power computation unit 51, the order-specific reactive power computation unit 52, the computation unit 41, the active power command generation unit 42, the reactive power command generation unit 43, the drive command generation unit 44, the active power limiter 53, and the reactive power limiter 54.

It can also be said that a program stored in the memory 82 causes a computer to perform a procedure or method to be performed by at least part of the detection unit 3 and the control unit 4. In more detail, it can also be said that a program stored in the memory 82 causes a computer to perform a procedure or method to be performed by at least part of the order-specific active power computation unit 51, the order-specific reactive power computation unit 52, the computation unit 41, the active power command generation unit 42, the reactive power command generation unit 43, the drive command generation unit 44, the active power limiter 53, and the reactive power limiter 54.

The memory 82 is, for example, a non-volatile or volatile semiconductor memory such as a random access memory (RAM), a read-only memory (ROM), a flash memory, an erasable programmable read-only memory (EPROM), an electrically erasable programmable read-only memory (EEPROM) (registered trademark); a magnetic disk; a flexible disk; an optical disk; a compact disc; a MiniDisc; a digital versatile disk (DVD); or the like.

Multiple portions of the functionality of the detection unit 3 and the control unit 4 may be implemented such that part of the multiple portions of the functionality is implemented in a dedicated hardware element, and the remainder of the multiple portions of the functionality is implemented in software or firmware. Thus, the multiple portions of the functionality of the detection unit 3 and of the control unit 4 can be implemented in hardware, software, firmware, or a combination thereof.

In more detail, multiple portions of the functionality of the order-specific active power computation unit 51, the order-specific reactive power computation unit 52, the computation unit 41, the active power command generation unit 42, the reactive power command generation unit 43, the drive command generation unit 44, the active power limiter 53, and the reactive power limiter 54 may be implemented such that part of the multiple portions of the functionality is implemented in a dedicated hardware element, and the remainder of the multiple portions of the functionality may be implemented in software or firmware. Thus, the multiple portions of the functionality of the order-specific active power computation unit 51, the order-specific reactive power computation unit 52, the computation unit 41, the active power command generation unit 42, the reactive power command generation unit 43, the drive command generation unit 44, the active power limiter 53, and the reactive power limiter 54 can be implemented in hardware, software, firmware, or a combination thereof.

Second Embodiment

Figure 9:
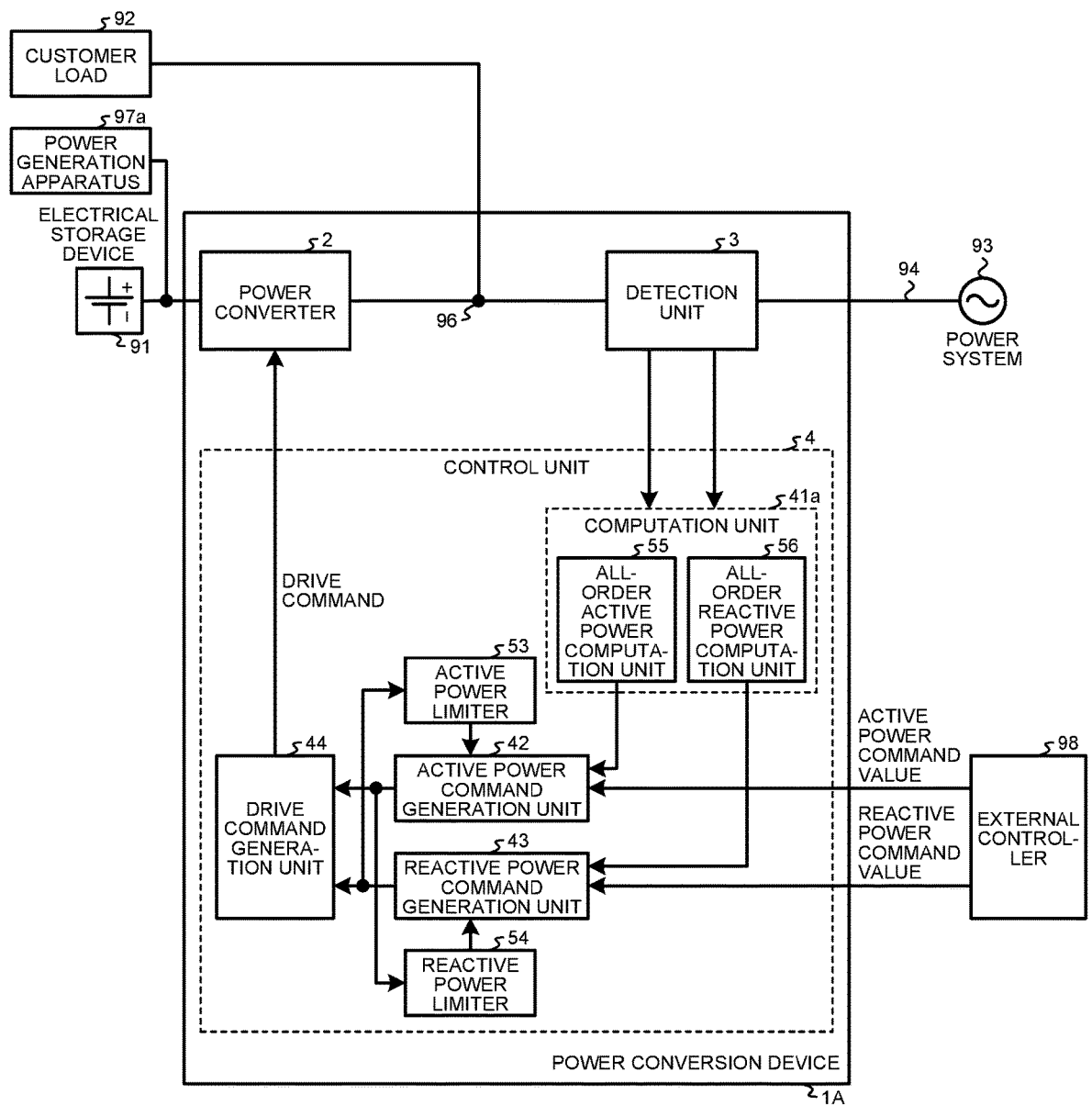
FIG. 9 is a diagram illustrating a configuration of a power conversion device according to a second embodiment.

A power conversion device 1A according to a second embodiment will next be described. FIG. 9 is a diagram illustrating a configuration of the power conversion device 1A according to the second embodiment. As is obvious from a comparison between FIG. 2 for the first embodiment and FIG. 9 for the second embodiment, the power conversion device 1A includes all the components included in the power conversion device 1 according to the first embodiment except for the order-specific active power computation unit 51 and the order-specific reactive power computation unit 52. The power conversion device 1A includes, in place of the order-specific active power computation unit 51 and the order-specific reactive power computation unit 52, an all-order active power computation unit 55 and an all-order reactive power computation unit 56. The power conversion device 1A includes, in place of the computation unit 41 of the power conversion device 1, a computation unit 41a that includes the all-order active power computation unit 55 and the all-order reactive power computation unit 56. In the second embodiment, the power generation apparatus 97 is not connected to the power line 94. The second embodiment will be mainly described in terms of differences from the first embodiment.

In the second embodiment, the power converter 2 is connected with the power generation apparatus 97a that generates DC power, in parallel with the electrical storage device 91. For example, the power generation apparatus 97a is a device that generates DC power by solar power generation. The power converter 2 also has the function to convert the DC power generated by the electrical storage device 91 and by the power generation apparatus 97a into AC power, and a function to output the AC power based on the DC power generated by the electrical storage device 91 and by the power generation apparatus 97a, to the customer load 92 and to the power system 93. Note that the power converter 2 may be connected with only one of the electrical storage device 91 and the power generation apparatus 97a. The power generation apparatus 97a may be connected to the power converter 2 included in the power conversion device 1 according to the first embodiment, in parallel with the electrical storage device 91.

The all-order active power computation unit 55 calculates, based on the voltage and on the current detected by the detection unit 3, an all-order active power value, which is an accumulation of the active power value at the frequency of the AC power from the power system 93, and the one or more active power values at respective multiplied frequencies obtained by multiplication of the above frequency by respective number(s) ranging from 2 to a predetermined integer greater than or equal to 2. That is, the all-order active power computation unit 55 calculates the all-order active power value, which is an accumulation of the active power value at the frequency of the AC power from the power system 93 and the one or more active power values at respective multiplied frequencies based on the above frequency. The all-order reactive power computation unit 56 calculates, based on the voltage and on the current detected by the detection unit 3, an all-order reactive power value, which is an accumulation of the reactive power value at the frequency of the AC power of the power system 93, and the one or more reactive power values at respective multiplied frequencies obtained by multiplication of the above frequency by respective number(s) ranging from 2 to a predetermined integer greater than or equal to 2. That is, the all-order reactive power computation unit 56 calculates the all-order reactive power value, which is an accumulation of the reactive power value at the frequency of the AC power of the power system 93 and the one or more reactive power values at respective multiplied frequencies based on the above frequency. The above frequency is the reference frequency.

The active power command generation unit 42 generates the command value for an output of active power based on the active power command value supplied from the external controller 98 and on the all-order active power value calculated by the all-order active power computation unit 55. Specifically, to reduce the difference between the active power command value and the all-order active power value calculated by the all-order active power computation unit 55, the active power command generation unit 42 subtracts the all-order active power value from the active power command value to generate the command value for an output of active power.

The reactive power command generation unit 43 generates the command value for an output of reactive power based on the reactive power command value supplied from the external controller 98 and on the all-order reactive power value calculated by the all-order reactive power computation unit 56. Specifically, to reduce the difference between the reactive power command value and the all-order reactive power value calculated by the all-order reactive power computation unit 56, the reactive power command generation unit 43 subtracts the all-order reactive power value from the reactive power command value to generate the command value for an output of reactive power.

Figure 10:
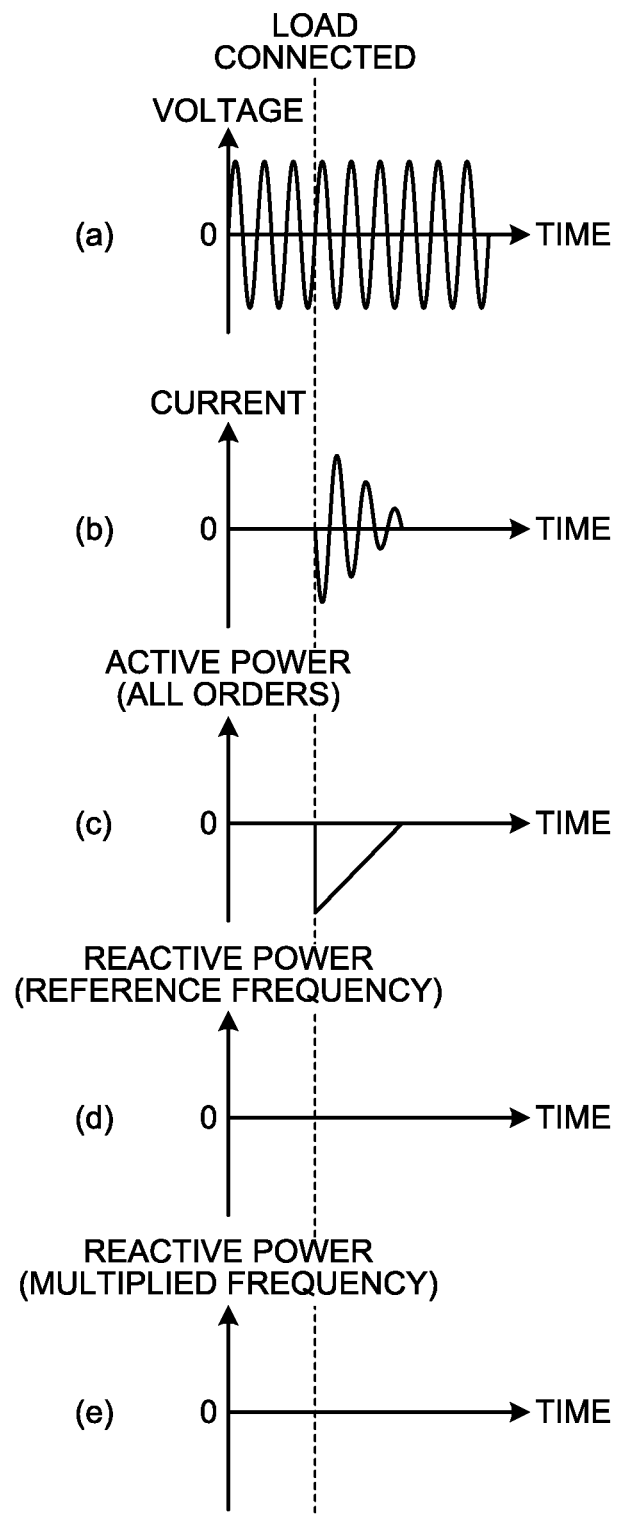
FIG. 10 is a diagram illustrating an example of waveforms of voltage and of current related to the tidal power and waveforms of the tidal power in a case in which the customer load is a resistive load, and the customer load is connected to the power converter of the power conversion device according to the second embodiment.

An operation of the power conversion device 1A will next be described with reference to FIGS. 10 to 13. That is, a tidal power control method performed by the power conversion device 1A will be described with reference to FIGS. 10 to 13. FIG. 10 is a diagram illustrating an example of waveforms of the voltage and of the current related to the tidal power and waveforms of the tidal power in a case in which the customer load 92 is a resistive load, and the customer load 92 is connected to the power converter 2 of the power conversion device 1A according to the second embodiment. FIG. 10 indicates the situation in which the customer load 92 is connected to the power converter 2 by a phrase of "Load Connected".

In FIG. 10, the current polarity is defined such that the direction in which a current flows from the power converter 2 to the power system 93 is the positive direction. The polarity of active power is defined such that the direction of discharging from the power converter 2 to the power system 93 is the positive direction. The direction of discharging is the direction of selling electric power. The polarity of reactive power is defined such that the direction of discharging phase-advanced reactive power from the power converter 2 to the power system 93 is the positive direction. For ease of illustration of the control method, it is assumed hereinafter that the active power command value and the reactive power command value supplied from the external controller 98 are each zero.

FIG. 10(*a*) is a diagram illustrating a waveform of the voltage detected by the detection unit 3. FIG. 10(*b*) is a diagram illustrating a waveform of the current detected by the detection unit 3. FIG. 10(*c*) is a diagram illustrating the all-order active power value. FIG. 10(*d*) is a diagram illustrating the reactive power value at the reference frequency.

FIG. 10(e) is a diagram illustrating the reactive power value at the multiplied frequency or frequencies.

Figure 11:
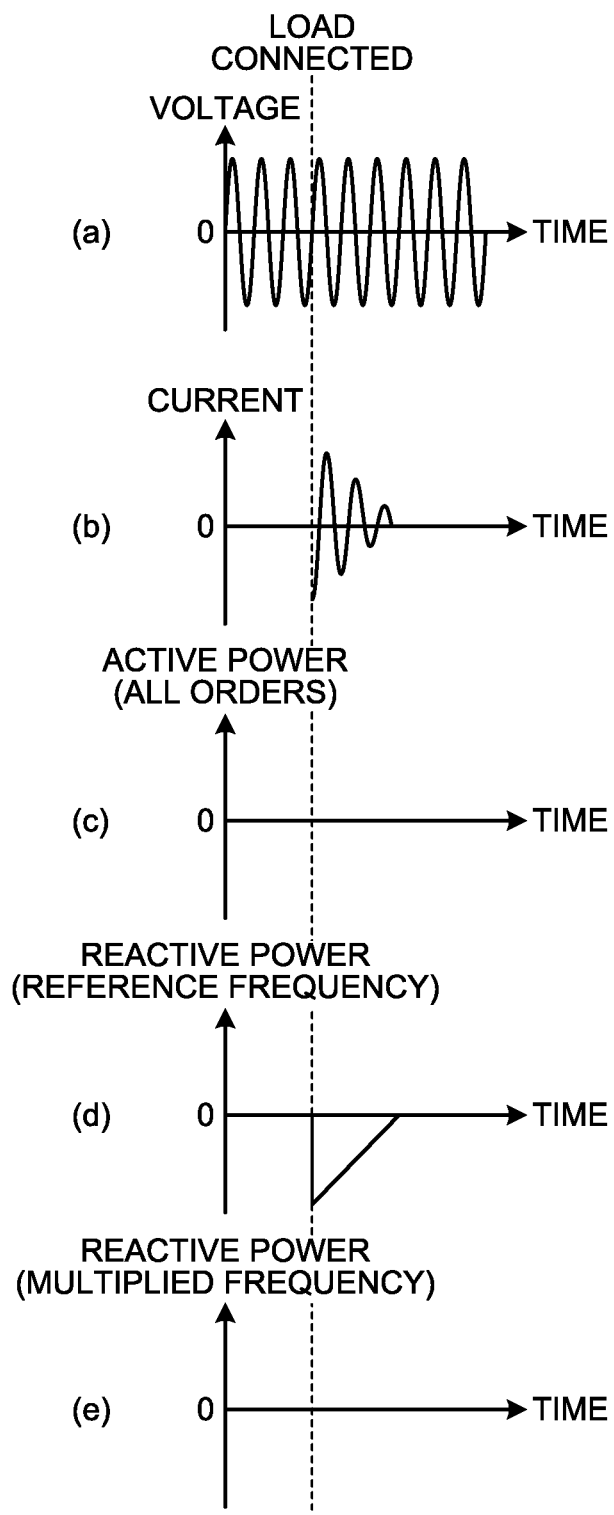
FIG. 11 is a diagram illustrating an example of waveforms of voltage and of current related to the tidal power and waveforms of the tidal power in a case in which the customer load is a capacitive load, and the customer load is connected to the power converter of the power conversion device according to the second embodiment.

FIG. 11 is a diagram illustrating an example of waveforms of the voltage and of the current related to the tidal power and waveforms of the tidal power in a case in which the customer load 92 is a capacitive load, and the customer load 92 is connected to the power converter 2 of the power conversion device 1A according to the second embodiment. One example of the capacitive load is a capacitor load. The respective meanings of polarity and of the phrase of "Load Connected" of FIG. 11 are the same as the meanings described in relation to FIG. 10.

FIG. 11(a) is a diagram illustrating a waveform of the voltage detected by the detection unit 3. FIG. 11(b) is a diagram illustrating a waveform of the current detected by the detection unit 3. FIG. 11(c) is a diagram illustrating the all-order active power value. FIG. 11(d) is a diagram illustrating the reactive power value at the reference frequency. FIG. 11(e) is a diagram illustrating the reactive power value at the multiplied frequency or frequencies.

Figure 12:
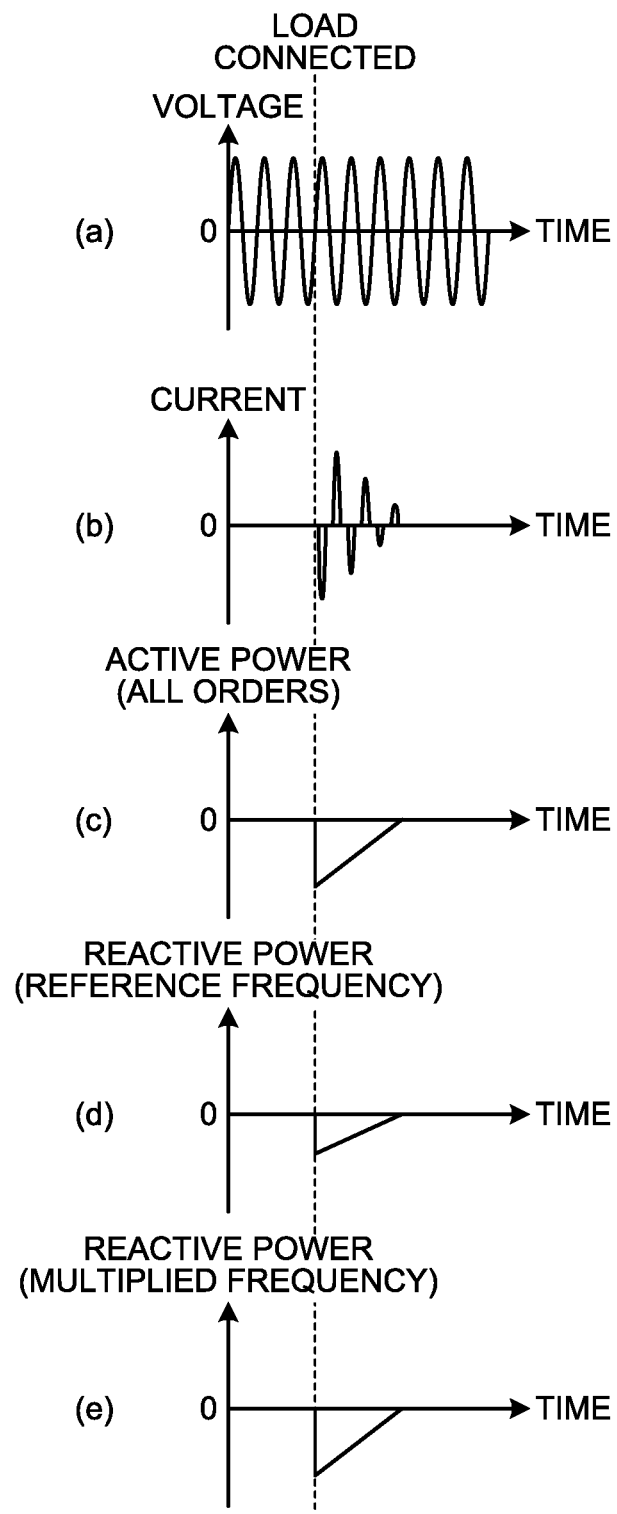
FIG. 12 is a diagram illustrating an example of waveforms of voltage and of current related to the tidal power and waveforms of the tidal power in a case in which the customer load is a harmonic generating load, and the customer load is connected to the power converter of the power conversion device according to the second embodiment.

FIG. 12 is a diagram illustrating an example of waveforms of the voltage and of the current related to the tidal power and waveforms of the tidal power in a case in which the customer load 92 is a harmonic generating load, and the customer load 92 is connected to the power converter 2 of the power conversion device 1A according to the second embodiment. One example of the harmonic generating load is a capacitive input load. Also in FIG. 12, the respective meanings of polarity and of the phrase of "Load Connected" are the same as the meanings described in relation to FIG. 10.

FIG. 12(a) is a diagram illustrating a waveform of the voltage detected by the detection unit 3. FIG. 12(b) is a diagram illustrating a waveform of the current detected by the detection unit 3. FIG. 12(c) is a diagram illustrating the all-order active power value. FIG. 12(d) is a diagram illustrating the reactive power value at the reference frequency. FIG. 12(e) is a diagram illustrating the reactive power value at the multiplied frequency or frequencies.

Figure 13:
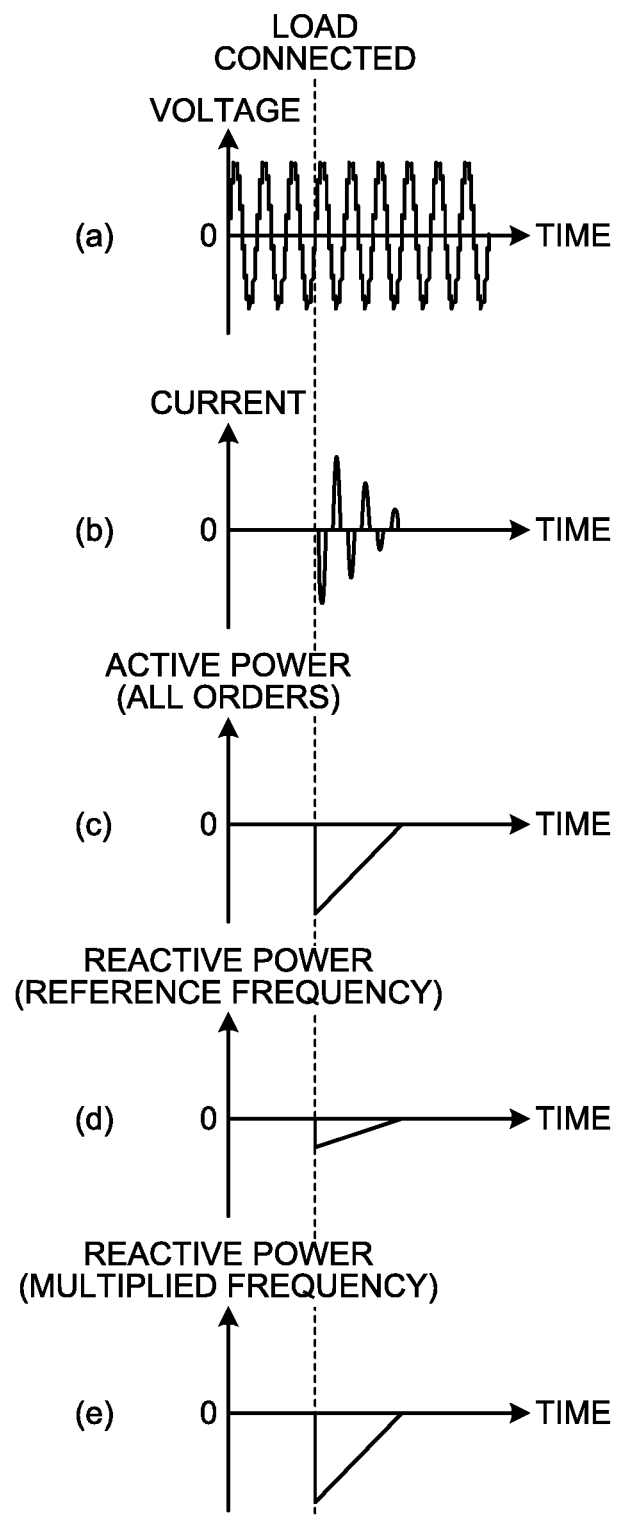
FIG. 13 is a diagram illustrating an example of waveforms of voltage and of current related to the tidal power and waveforms of the tidal power in a case in which the customer load is a harmonic generating load, and the customer load is connected to the power converter of the power conversion device according to the second embodiment.

FIG. 13 is a diagram illustrating an example of waveforms of the voltage and of the current related to the tidal power and waveforms of the tidal power in a case in which the customer load 92 is a harmonic generating load, and the customer load 92 is connected to the power converter 2 of the power conversion device 1A according to the second embodiment. One example of the harmonic generating load is a capacitive input load. Also in FIG. 13, the respective meanings of polarity and of the phrase of "Load Connected" are the same as the meanings described in relation to FIG. 10.

FIG. 13(a) is a diagram illustrating a waveform of the voltage detected by the detection unit 3. FIG. 13(b) is a diagram illustrating a waveform of the current detected by the detection unit 3. FIG. 13(c) is a diagram illustrating the all-order active power value. FIG. 13(d) is a diagram illustrating the reactive power value at the reference frequency. FIG. 13(e) is a diagram illustrating the reactive power value at the multiplied frequency or frequencies.

A main difference between the second embodiment and the first embodiment is that the power conversion device 1 according to the first embodiment does not include the all-order active power computation unit 55, while the power conversion device 1A according to the second embodiment includes the all-order active power computation unit 55. The description below will focus on this main difference between the second embodiment and the first embodiment, i.e., the operation of the all-order active power computation unit 55.

As illustrated in FIG. 10(c), connection of the customer load 92 to the power converter 2 results in an increase in the all-order active power value in the negative direction, i.e., in the direction of purchasing electric power. The all-order active power computation unit 55 calculate, based on the voltage and on the current detected by the detection unit 3, the all-order active power value, which is an accumulation of the active power value at the frequency of the AC power of the power system 93, and the one or more active power values at respective multiplied frequencies obtained by multiplication of the above frequency by respective number(s) ranging from 2 to a predetermined integer greater than or equal to 2. That is, the all-order active power computation unit 55 calculates the all-order active power value, which is an accumulation of the active power value at the frequency of the AC power of the power system 93 and the one or more active power values at respective multiplied frequencies based on the above frequency. The above frequency is the reference frequency. The customer load 92 has only a component having the reference frequency, and thus, in the example described referring to FIG. 10, the all-order active power computation unit 55 calculates the active power value at the reference frequency. The all-order active power computation unit 55 calculates the all-order active power value including the polarity.

Specifically, the all-order active power computation unit 55 calculates the tidal power based on the voltage detected by the detection unit 3 and on the current detected by the detection unit 3. Then, the all-order active power computation unit 55 assumes that the frequency of the voltage detected by the detection unit 3 is the reference frequency of the tidal power, and averages multiple active power values at the reference frequency to calculate the all-order active power value. The voltage detected by the detection unit 3 is the voltage of the AC power of the power system 93. Alternatively, the all-order active power computation unit 55 applies a filtering operation to reduce values in bands other than a specific frequency band to calculate the all-order active power value.

In the example of FIGS. 11 and 12, the all-order active power computation unit 55 operates similarly to the all-order active power computation unit 55 described with reference to FIG. 10.

In FIG. 13, in a case in which the voltage detected by the detection unit 3 contains a harmonic component, connection of the customer load 92 that is a harmonic generating load to the power converter 2 results in an increase in the reactive power value at the reference frequency and in the reactive power value at the multiplied frequency or frequencies both in the negative direction, i.e., in the direction of purchasing electric power as illustrated in FIGS. 13(d) and 13(e). The all-order active power computation unit 55 calculates, based on the voltage and on the current detected by the detection unit 3, the all-order active power value, which is an accumulation of the active power value at the frequency of the AC power of the power system 93, and the one or more active power values at respective multiplied frequencies obtained by multiplication of the above frequency by respective number(s) ranging from 2 to a predetermined integer greater than or equal to 2. That is, the all-order active power computation unit 55 calculates the all-order active power value, which is an accumulation of the active power value at the frequency of the AC power of the power system 93 and the one or more active power values at respective multiplied frequencies based on the above frequency. The above frequency is the reference frequency. The customer load 92 generates a component having the reference frequency and one or more components having respective multiplied frequencies. Thus, in the example described referring to FIG. 13, the all-order active power computation unit 55 calculates the all-order active power value that is an accumulation of the active power value at the reference frequency and the active power value at the multiplied frequency or frequencies. The all-order active power computation unit 55 calculates the all-order active power value including the polarity.

Specifically, the all-order active power computation unit 55 calculates the tidal power based on the voltage detected by the detection unit 3 and on the current detected by the detection unit 3. Then, the all-order active power computation unit 55 assumes that the frequency of the voltage detected by the detection unit 3 is the reference frequency of the tidal power, and averages multiple active power values at a multiple or multiples of the reference frequency to calculate the all-order active power value. The voltage detected by the detection unit 3 is the voltage of the AC power of the power system 93. Alternatively, the all-order active power computation unit 55 applies a filtering operation to reduce values in bands other than a specific frequency band to calculate the all-order active power value.

A main difference between the second embodiment and the first embodiment is that the power conversion device 1A according to the second embodiment includes the all-order active power computation unit 55 and the all-order reactive power computation unit 56 in place of the order-specific active power computation unit 51 and the order-specific reactive power computation unit 52 included in the power conversion device 1 according to the first embodiment.

The power conversion device 1A detects the voltage and the current at the first point 95 on the power line 94 that connects the power converter 2 with the power system 93, and generates the drive command for controlling the power converter 2, based on the voltage and on the current detected, and on the active power command value and the reactive power command value supplied from the external controller 98. The power conversion device 1A is advantageous in being capable of outputting power taking into account the power output from the electrical storage device 91 connected thereto, the power consumption of the customer load 92, and the active power command value and the reactive power command value supplied from the external controller 98. In more detail, the power conversion device 1A can allow the tidal power to follow the active power command value and the reactive power command value supplied from the external controller 98, and can thus supply active power and reactive power at respective levels needed for the entire power distribution system, to the power system 93.

The power conversion device 1A includes the active power limiter 53 and the reactive power limiter 54. This allows the command value for an output of active power and the command value for an output of reactive power, which originate the drive command, to become values that prevent outputting of power exceeding the upper limit value of the apparent power. This enables the power conversion device 1A to avoid a situation that requires outputting of power exceeding the upper limit value of the apparent power, thereby reducing or preventing occurrence of malfunction in the power conversion device 1A.

As described above, the power conversion device 1A according to the second embodiment includes the all-order active power computation unit 55 and the all-order reactive power computation unit 56 in place of the order-specific active power computation unit 51 and the order-specific reactive power computation unit 52 included in the power conversion device 1 according to the first embodiment. The all-order active power computation unit 55 and the all-order reactive power computation unit 56 respectively calculate the all-order active power value and the all-order reactive power value, and do not respectively calculate active power values and reactive power values at multiple multiplied frequencies, and can therefore respectively calculate the active power value and the reactive power value more easily than the order-specific active power computation unit 51 and the order-specific reactive power computation unit 52.

Part or all of the all-order active power computation unit 55 and the all-order reactive power computation unit 56 may be a processing circuit having the same functionality as the functionality of the processing circuit 71 described in the first embodiment. At least part of the functionality of the all-order active power computation unit 55 and of the all-order reactive power computation unit 56 may be implemented in a processor having the same functionality as the functionality of the processor 81 described in the first embodiment. In a case in which at least part of the functionality of the all-order active power computation unit 55 and of the all-order reactive power computation unit 56 is implemented in a processor, the power conversion device 1A includes a memory for storing programs that cause the processor to perform steps to be performed by the at least part of the all-order active power computation unit 55 and the all-order reactive power computation unit 56. This memory is a memory having the same functionality as the functionality of the memory 82 described in the first embodiment.

Note that, also in the second embodiment, the power generation apparatus 97 described in the first embodiment may also be connected to the second point 96, on the power line 94, positioned between the power converter 2 and the first point 95.

The configurations described in the foregoing embodiments are merely examples of various aspects of the present invention. These configurations may be combined with a known other technology, and a part of such configurations may be omitted or modified without departing from the spirit of the present invention.

REFERENCE SIGNS LIST 1, 1A power conversion device; 2 power converter; 3 detection unit; 4 control unit; 41, 41a computation unit; 42 active power command generation unit; 43 reactive power command generation unit; 44 drive command generation unit; 51 order-specific active power computation unit; 52 order-specific reactive power computation unit; 53 active power limiter; 54 reactive power limiter; 55 all-order active power computation unit; 56 all-order reactive power computation unit; 71 processing circuit; 81 processor; 82 memory; 91 electrical storage device; 92 customer load; 93 power system; 94 power line; 95 first point; 96 second point; 97, 97a power generation apparatus; 98 external controller.

The invention claimed is:
1. A power conversion device comprising:
a power converter connected to an electrical storage device that stores direct current (DC) power, and having a function to convert the DC power stored in the electrical storage device into alternating current (AC) power, and also having a function to output the AC power to one or both of a customer load and a power system;

a detector to detect voltage and current at a first point on a power line that connects the power converter with the power system; and a controller to generate a drive command for controlling the power converter based on the voltage and on the current detected by the detector, wherein the customer load is connected to a second point, on the power line, between the power converter and the first point, the power converter operates on a basis of the drive command generated by the controller, and the controller includes
 a calculator to calculate an active power value and a reactive power value of a tidal power based on the voltage and on the current detected by the detector,
 an active power command generator to generate a command value for an output of active power based on an active power command value supplied from an external controller disposed outside the power conversion device, and on the active power value calculated by the calculator,
 a reactive power command generator to generate a command value for an output of reactive power based on a reactive power command value supplied from the external controller and on the reactive power value calculated by the calculator, and
 a drive command generator to generate the drive command based on one or both of the command value for an output of active power generated by the active power command generator and the command value for an output of reactive power generated by the reactive power command generator, the calculator calculates
 the active power value of the tidal power by accumulating an active power value at a frequency of AC power of the power system and one or more active power values at respective multiplied frequencies based on the frequency, or
 the reactive power value of the tidal power by accumulating a reactive power value at the frequency of the AC power of the power system and one or more reactive power values at respective multiplied frequencies based on the frequency.

2. The power conversion device according to claim 1, wherein
the calculator includes
 an all-order active power calculator to calculate, based on the voltage and on the current detected by the detector, an all-order active power value that is an accumulation of a reactive power value at the frequency of the AC power of the power system and one or more active power values at respective multiplied frequencies based on the frequency,
the active power command generator generates the command value for an output of active power based on the active power command value, and on the all-order active power value calculated by the all-order active power calculator.

3. The power conversion device according to claim 1, wherein
the calculator includes
 an all-order reactive power calculator to calculate, based on the voltage and on the current detected by the detector, an all-order reactive power value that is an accumulation of a reactive power value at the frequency of the AC power of the power system and one or more reactive power values at respective multiplied frequencies based on the frequency,
the reactive power command generator generates the command value for an output of reactive power based on the reactive power command value and on the all-order reactive power value calculated by the all-order reactive power calculator.

4. The power conversion device according to claim 1, wherein
the controller further includes an active power limiter to set an upper setting limit that is an upper limit of the command value for an output of active power, based on the reactive power command value supplied from the external controller, and on an upper limit value of apparent power that can be output by the power converter, and
the active power command generator generates the command value for an output of active power less than or equal to the upper setting limit set by the active power limiter.

5. The power conversion device according to claim 1, wherein
the controller further includes a reactive power limiter to set an upper setting limit that is an upper limit of the command value for an output of reactive power, based on the active power command value supplied from the external controller, and on an upper limit value of apparent power that can be output by the power converter, and
the reactive power command generator generates the command value for an output of reactive power less than or equal to the upper setting limit set by the reactive power limiter.

6. The power conversion device according to claim 1, wherein a power generation apparatus that output AC power is connected to the first point.

7. The power conversion device according to claim 1, wherein
the power converter is connected with a power generation apparatus that generates DC power in parallel with the electrical storage device, and
the power converter includes a function to convert the DC power generated by the electrical storage device and by the power generation apparatus, into AC power.

* * * * *